June 1, 1954  L. K. GRIBSKOV ET AL  2,680,041
MILK BOTTLE CARRYING DEVICE
Filed April 23, 1952  2 Sheets-Sheet 1

INVENTORS
LESLIE K. GRIBSKOV
BY OLSE N. PETERSON
Atty.

June 1, 1954  L. K. GRIBSKOV ET AL  2,680,041
MILK BOTTLE CARRYING DEVICE
Filed April 23, 1952  2 Sheets-Sheet 2
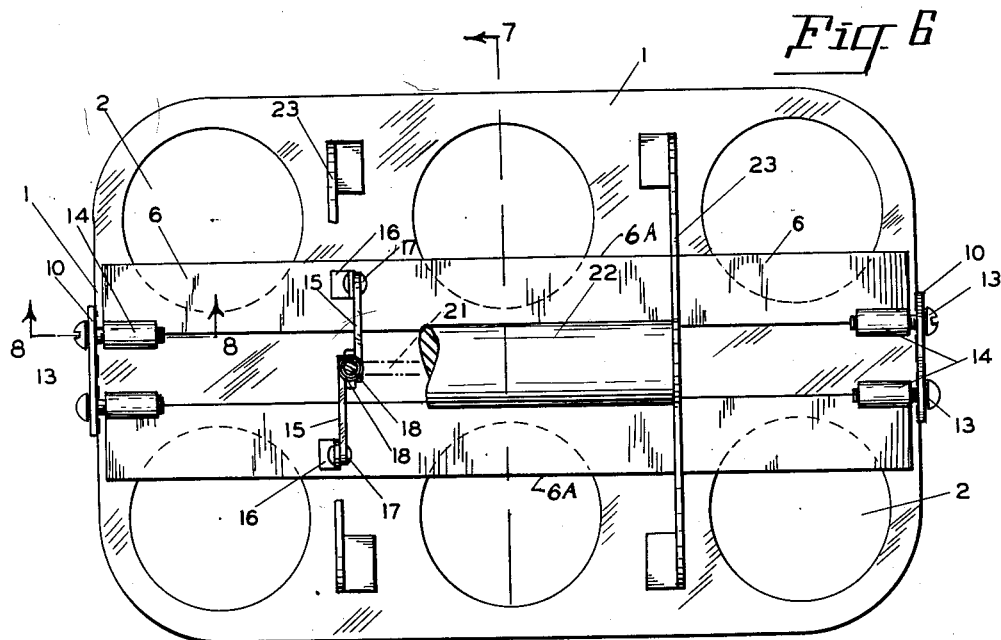
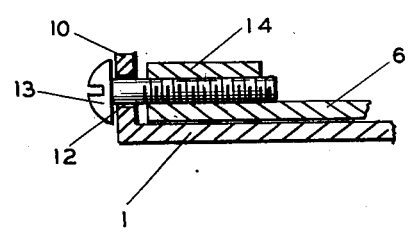
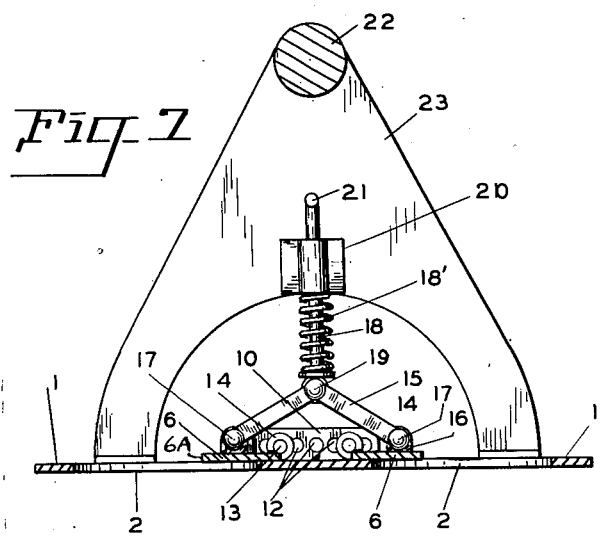
INVENTORS.
LESLIE K. GRIBSKOV
BY OLSE N. PETERSON Patented June 1, 1954

2,680,041

UNITED STATES PATENT OFFICE 2,680,041

MILK BOTTLE CARRYING DEVICE

Leslie K. Gribskov and Olse N. Peterson,
Junction City, Oreg.

Application April 23, 1952, Serial No. 283,826

2 Claims. (Cl. 294—87.24)

1

This invention relates to milk bottle carrying devices, and the primary object of the same is to provide a carrying device that will enable the milkman to carry two or more bottles of milk at one time, the device being capable of entering the milk bottle case, selecting from two to six bottles at a time.

A further object of this invention is to provide a carrying device that will grip the necks of the bottles by a simple movement of the milkman's index finger, and the said bottles can be released by the same operation.

By the use of this new carrying device, the bottles can be handled in cold weather easily, because the milkman can wear gloves, being still able to operate the release mechanism associated with the carrier.

These and other incidental objects will be apparent in the drawings, specification and claims.

Referring to the drawings:

Figure 6 is a plan view, partially broken away, of a slightly modified form of locking bar mechanism.

Figure 7 is an end sectional view, taken on line 7—7 of Figure 6.

Figure 8 is an enlarged fragmentary detail sectional view, taken on line 8—8 of Figure 6.

Figure 1:
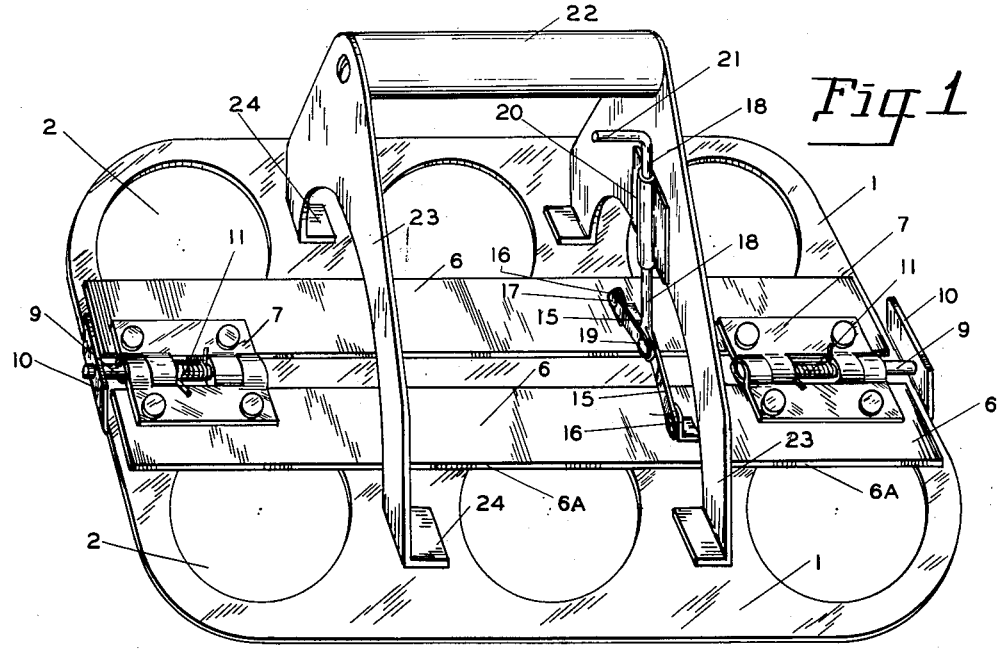
Figure 1 is a plan perspective view of our new and improved milk bottle carrying device.

Referring more specifically to the drawings:

Our new and improved milk bottle carrying device consists of a flat base plate 1. A series of openings 2 are formed in the plate 1 to receive the necks 3 of the milk bottles 4. The holes 2 are of sufficient diameter to permit the tops 5 of the milk bottles to pass freely therethrough.

Figures 4, 5:
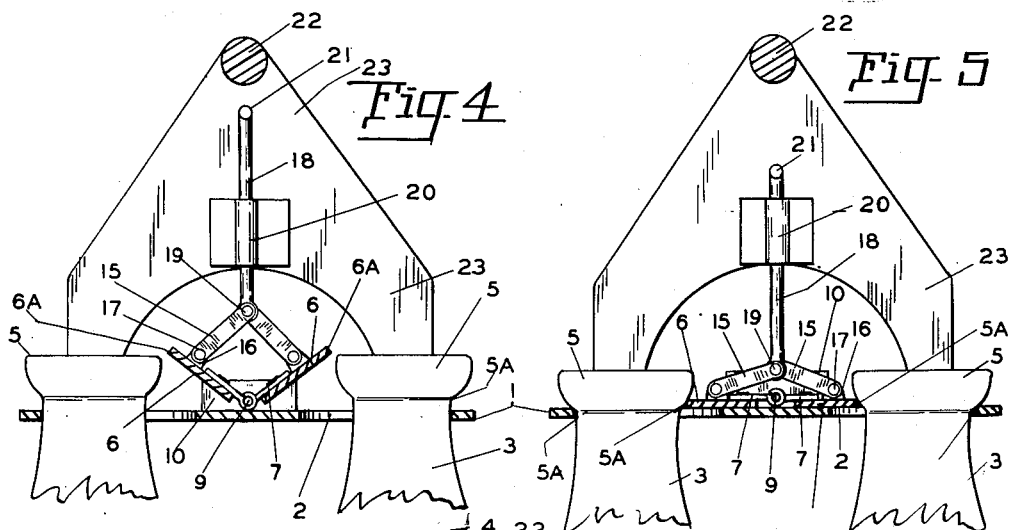
Figure 4 is a fragmentary enlarged and sectional view, taken on line 4—4 of Figure 3, illustrating the release mechanism in a position for releasing or engaging the necks of the milk bottles.
Figure 5 illustrates the releasing mechanism in a position for gripping the necks of the milk bottles.

Locking bars 6 run lengthwise of the carrier, as best illustrated in Figures 1, 4 and 5. In these figures the locking bars are indicated as connected together by the hinges 7. The hinge pins 8 extend beyond the hinges and are journaled within bearings 9 of the upturned flanges 10,

2 forming part of the base 1. The locking bars 6 are held down against the base 1 by the action of the coil springs 11.

In Figures 6, 7 and 8 a modified and preferred form of bar mounting is illustrated. The upturned flanges 10 having a series of bearings 12 through which the pivot pins or screws 13 pass. These screws may be threaded into the rolled portions 14 forming part of the locking bars 6. In the drawings we illustrate this pivot pin as a screw threaded into the rolled portion. Any of the bearings 12 may be selected for pivoting the bars relative thereto. The object of the provision for a selection of the pivot points is to accommodate the locking bars for various sized bottle necks.

The edges 6A of the locking bars 6 engage the underside 5A of the tops of the bottles 4, forcing the opposite side of the bottles against the edge of the opening 2 when in the position shown in Figure 5, the space between the edge 6A of the locking bar and the opposite edge of the opening is less than the width of the top 5 of the bottle, thereby holding the bottle within the openings 2. The opposite edges of the bars 6 are pivotally mounted as above explained, the edges 6A being raised and lowered by the operator by way of the following mechanism.

Links 15 have one of their ends pivoted to the bars 6 by way of the brackets 16 and pivot pins 17. The opposite end of the links are pivotally connected to the vertically journalled stem 18 at 19. The stem 18 is slidably mounted within the guideways 20, having its upper end bent at right angles as indicated at 21 to the said stem. A handle 22 is secured to the upwardly extending brackets 23, which are in turn fixedly secured to the base 1 at 24 by any suitable means.

We will now describe the operation of our new and improved milk bottle carrying device. The openings 2 are slipped down over the tops 5 of the bottles by lifting the locking bars 6 to the position illustrated in Figure 4 by the forefinger of the operator lifting the horizontal portion 21 of the stem 18 raising the links 15 as illustrated, together with the locking bars 6. After the base is lowered over the tops 5 of the bottle and around the necks 3 of the bottle, the operator releases the portion 21 of the stem 18, which will allow the locking pins to take the position as illustrated under the top 5 in Figure 5.

In the case of Figure 1, the springs 11 would force the bars down, but in the case of Figure 6 the coil spring 18' will force the stem 18 down together with the links 15 holding the bars 6, as best illustrated in the position shown in Figure 7, under the tops 5 and around the necks 3 of the bottles 4.

Figures 2, 3:
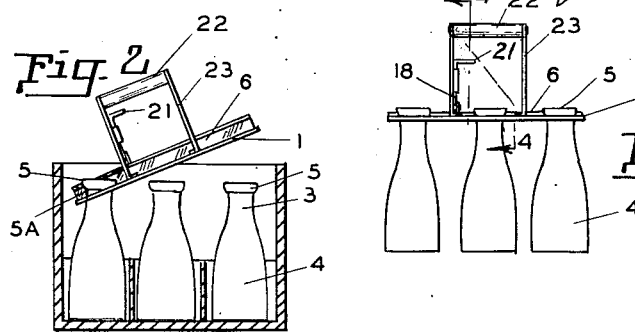
Figure 2 illustrates how the same enters the case of milk bottles. In this view two bottles are being selected.
Figure 3 illustrates the carrier supporting six bottles of milk.

In Figure 2 we illustrate how the carrier can be tilted for lifting any desired number of bottles from the carrying case. The more horizontal the position of the carrier when inserted over the necks of the bottles, the more bottles will be lifted. One of the important features of the carrying device is that it is of a length to go down into the bottle case.

When the bottles are being carried, the locking bars 6 will be of sufficient width to force the neck of the bottle against the inner edge of the openings 2 so that the tops of the bottles will not be able to clear the edge of the holes or the edge of the locking bar as best illustrated in Figure 5.

What we claim is:

1. A bottle carrier comprising a flat base formed with oppositely disposed spaced apart openings to receive the necks of bottles, the opposite ends of the flat base having upturned flanges, each formed with spaced apart bearings, a pair of spaced apart plates supported on the flat base, the said plates overlapping the openings, each plate having its inner end portion formed into aligned bearings in alignment with the spaced apart bearings on the ends of the flat base, a screw extending through each of the aligned bearings, a pair of spaced apart vertical supports secured to the flat base beyond the spaced plates, a rod connecting the upper ends of the supports to form a handle, a pair of links pivoted at their ends to the spaced apart plates, a vertically disposed handle mounted to slide on the inside of one of the supports, a pivot connecting the inner ends of the pairs of links to the vertical handle, and a spring on the vertical handle to normally force the plates down on the flat base.

2. A bottle carrier as defined in claim 1 wherein the flanges are formed with a series of said spaced apart bearings to selectively receive the screws and thereby selectively vary the extent of lap of the spaced apart plates over the openings.

References Cited in the file of this patent

UNITED STATES PATENTS

| Number | Name | Date |
|---|---|---|
| 689,694 | Snow et al. | Dec. 24, 1901 |
| 2,138,498 | McMillan | Nov. 29, 1938 |
| 2,140,314 | Doscher | Dec. 13, 1938 |
| 2,441,494 | Larmett et al. | May 11, 1948 |
| 2,510,392 | Everhart | June 6, 1950 |